Jan. 22, 1957 E. L. McINTYRE 2,778,469
CENTRIFUGAL CLUTCH
Filed Sept. 19, 1951
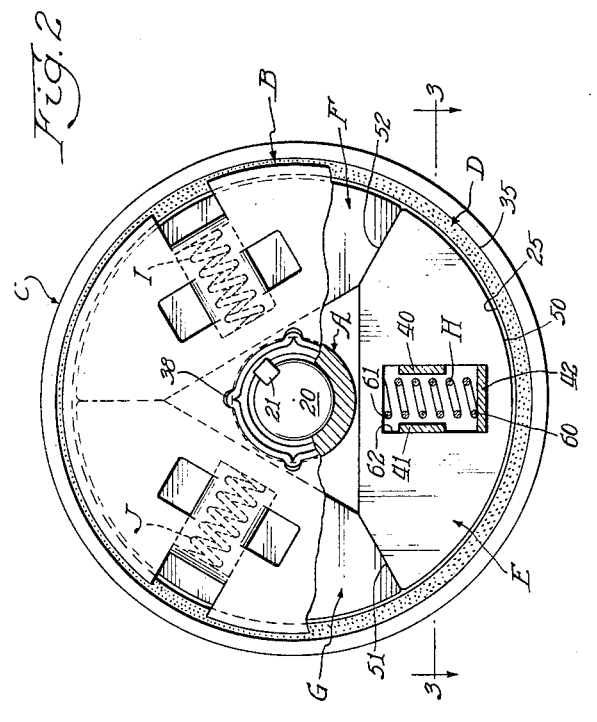
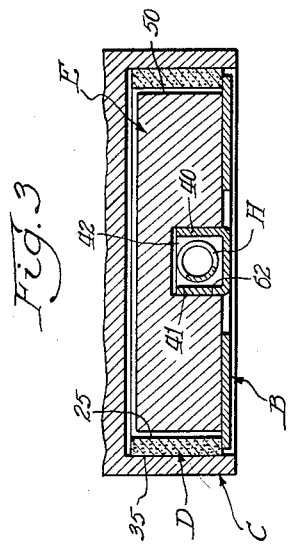
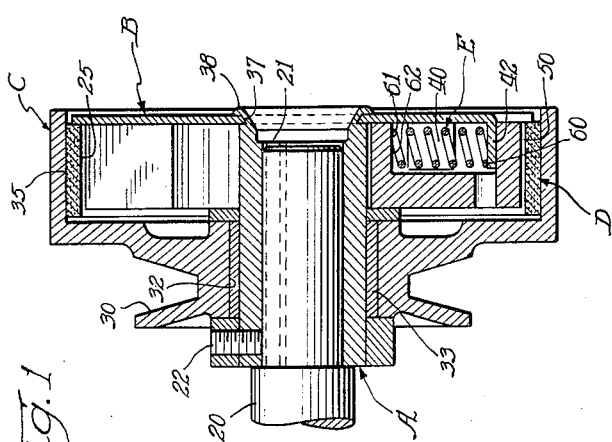
Inventor:
Elmer L. McIntyre
By: Joseph M. Gartner
Atty.

United States Patent Office 2,778,469
Patented Jan. 22, 1957

2,778,469

CENTRIFUGAL CLUTCH

Elmer L. McIntyre, Dearborn, Mich., assignor to Morse Chain Company, Ithaca, N. Y., a corporation of New York Application September 19, 1951, Serial No. 247,261

2 Claims. (Cl. 192—105)

This invention relates, in general, to power transmission equipment and has particular reference to a centrifugal clutch.

Otherwise stated, the invention is embodied in a clutch actuated responsive to centrifugal force, said clutch embodying a novel clutch plate and associated parts thereof providing an assembled centrifugal clutch of simple construction and economical to manufacture.

More specifically stated, it is an important object and accomplishment of the invention to provide a centrifugal clutch wherein the engagement of the clutch is effected by centrifugal force and wherein there is provided a clutch drum having a power take-off medium such as, for example, a belt pulley, sprocket teeth adapted to carry a chain, or gear teeth adapted for intermeshing with other gears; an annular lining of friction material loosely disposed in said drum so as to permit relative rotation therebetween under certain circumstances to be hereinafter described; speed responsive means including weighted elements carried by a plate member mounted on a hub, all of which are arranged for rotation in unison, said weighted elements being arranged to move radially outwardly responsive to centrifugal forces developed by rotation of said speed responsive means; spring means disposed between said weighted elements and said plate member to resist said outward movement of said weighted elements; said arrangement being particularly characterized in that the lining is disposed between the drum and the weighted elements and that the weighted elements are adapted to engage a friction surface of the lining upon application of sufficient centrifugal force, and as the magnitude of the centrifugal force increases the pressure upon the lining will be increased proportionately thereby to provide a progressive engagement between the weighted elements, the lining and the drum to cause said parts to rotate in unison to effect a driving arrangement for said power take-off medium.

The invention contemplates improvements in a centrifugal clutch whereby the engagement of the clutch elements will be progressive, smooth and chatter free with the engagement of the clutch elements being responsive to centrifugal force developed by rotation of elements of the clutch.

An ancillary object and accomplishment of the invention is to provide a more efficient centrifugal clutch which is adapted to be economically manufactured and which is so designed as to permit the manufacture and assembly thereof in accordance with present day large scale mass production manufacturing methods of construction and assembly.

The invention seeks, as a final object and accomplishment, to provide a centrifugal clutch particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same substantially as hereinafter more fully described, and as are particularly pointed out in the appended claims.

An exemplary embodiment of the invention is illustrated in the accompanying drawing forming a part hereof and wherein:

Fig. 1 is a sectional view of a centrifugal clutch embodying the features of the present invention;

Fig. 2 is a front elevational view of the centrifugal clutch depicted in Fig. 1 with portions thereof broken away and shown in section to more clearly illustrate the construction thereof; and Fig. 3 is a fragmentary sectional view of a portion of the centrifugal clutch depicted in Figs. 1 and 2 and being taken substantially on the plane of the line 3—3 in Fig. 2.

The drawing is to be more or less of a schematic character for the purpose of illustrating and disclosing a typical or preferred form of the improvements contemplated herein and in the drawing like reference characters identify the same parts in the several views.

Before explaining the present invention in detail, attention is invited to the premises that the invention is not limited in its application to the details of construction and arrangement of parts illustrated in the accompanying drawing, since the invention obviously is capable of other embodiments and of being practiced or carried out in various ways. Moreover, the details of construction may be modified to suit particular conditions or to satisfy the engineering genius of various competitive manufacturers, and I do not wish to be limited to the construction of these elements as set forth except where such construction particularly concerns the invention contemplated herein. Furthermore, the phraseology or terminology employed herein is for the purpose of description and not of limitation, and it is not intended to limit the invention claimed herein beyond the requirement of the prior art and the scope of the appended claims.

In the exemplary embodiment of the invention depicted in Figs. 1, 2 and 3, the centrifugal clutch contemplated by this invention comprises, in general, the component part assemblies respectively indicated in their entirety by the letters as follows: A hub as at A mounted on a drive shaft 20 for rotation therewith by means of a fitted key 21 and a set screw 22; a clutch plate B carried by portions of the hub A for rotation therewith; a drum as at C mounted on said hub A for relative rotation therebetween; an annular lining D of friction material inserted in said drum but not attached thereto so as to permit relative rotation therebetween; a plurality of weighted elements E, F and G guided by portions of said plate member for relative movement therebetween and said weighted elements being arranged to move radially outwardly responsive to centrifugal forces developed by rotation of said plate; a plurality of spring means indicated at H, I and J and respectively related to a weighted element as at E, F and G, said spring means being disposed between said weighted elements and said plate member to resist the outward movement of a respectively related weighted element; said arrangement being particularly characterized in that the lining D is disposed between the drum C and the weighted elements E, F and G and that the weighted elements E, F and G are adapted to engage a friction surface 25 of the lining upon application of sufficient centrifugal force, and as the magnitude of the centrifugal force increases the pressure upon the lining D will be increased proportionately thereby to provide a progressive engagement between the weighted elements E, F and G, the lining D and the drum C to cause said parts to rotate in unison to effect a driving arrangement therebetween.

For purposes of illustration, the drum C is provided with a V-belt pulley 30 adapted to receive a V-belt drive; however, it is within the purview of this invention to substitute for said V-belt pulley 30, a sprocket for a chain (not shown), or a set of gear teeth (not shown) adapted for intermeshing with other gear trains. The hub C is provided with a central bore 32 for a running fit on a suitable bearing 33 mounted on the periphery of the hub A so that the hub C at this point may freely rotate on the hub A.

As may be best seen in Figs. 1 and 2, the lining D is composed of a friction material formed to define an annular shape to provide a friction surface 25 and a friction surface 35, said lining being disposed in the drum but not fastened thereto so that these elements may have relative rotation therebetween.

An important contribution to this art is the provision of the relatively simple and economically manufactured clutch plate B which is provided with a central through bore 37 adapted to receive portions of the hub A adjacent one end thereof and the clutch plate B is fixedly mounted on the hub A by means of a plurality of swages indicated at 38 so that when the hub is rotated by means of the drive shaft 20 the clutch plate B will rotate therewith.

The clutch plate is formed by stamping to define the cut out and bent ears 40, 41 and 42 whose function will be hereinafter described in detail.

The weighted elements E, F and G are formed of relatively heavy material so as to react to the centrifugal forces applied thereto to effect radial outward movement thereof for the purpose of establishing engagement with the friction surface 25 of the lining D. For example, the segment E has an arcuate contact surface 50 and stop surfaces 51 and 52 adapted to engage corresponding stop surfaces of adjacent weighted elements G and F when said weighted elements are disposed in their normal inoperative position. The engagement of these stop surfaces will conveniently and properly position the weighted elements in their normal inoperative position.

In order to urge said weighted elements E, F and G to their normal inoperative positions and to cause resistance to the centrifugal forces established by rotation of the hub and the plate, there is provided respectively for said weighted elements E, F and G the spring means H, I and J. For example, the spring means H has one end as at 60 in engagement with the bent ear 42 and the other end 61 in engagement with portions of the weighted element E defined by a through aperture 62 of substantially rectangular shape and adapted to receive the ears 40, 41 and 42 for guiding purposes so as to control, to a degree, the relative movement of the weighted element E with respect to the plate B.

Thus, it can be seen that the respective spring means H, I and J will tend to urge their related weighted elements E, F and G to their normal inoperative position so that the arcuate surfaces as at 50 are disengaged from the friction surface 25 of the lining D. When sufficient centrifugal force is applied responsive to rotation of the hub A and plate B, the springs H, I and J will become compressed and the centrifugal force will be then sufficient to overcome the resistance of the springs to permit engagement of the arcuate surfaces as at 50 with the friction surface 25 of the lining D. As the centrifugal force increases the pressures applied will be proportionately greater to cause a progressive engagement of the friction surface 25 with the arcuate surface 50 to cause the same to rotate in unison and as this is being accomplished the friction surface 35 is also being progressively engaged with the drum C to cause these parts to finally rotate in unison to effect a driving arrangement for the driven medium which, in this case, is illustrated as being the V-belt pulley 30.

By employing the principles of this invention there is established a smooth and chatter free clutch engagement by the progressive engagement of the arcuate surface 50 with the friction surface 25 of the liner D and, as the resistance to relative movement of these parts is overcome, there is a further opportunity for progressive engagement between the friction surface 35 of the liner D and the drum C. Thus, if the resistance to relative movement of the surface 50 with respect to the friction surface 25 is overcome sharply or quickly, then the reaction to this sharp and quick engagement can be absorbed and taken by the relief effected by the progressive engagement between the friction surface 35 and the drum C, or vice versa.

It can also be seen that when the rotative speed of the hub A and the clutch plate B is reduced, the resistance of the spring will become effective to cause movement of related weighted elements radially inwardly to effect disengagement of the clutch.

Of course, the system may be balanced by judicious selection of proper weight in the weighted elements so that predetermined speeds of rotation will impart centrifugal forces sufficient and necessary to cause proper engagement of the clutch as desired.

From the foregoing, it may be observed that I have provided a centrifugal clutch which efficiently fulfills the objects thereof and which provides numerous advantages which may be summarized as follows:

1. Structurally simple, efficient and durable;
2. Economical to manufacture and readily adaptable to mass production manufacturing methods of construction and assembly; and
3. The provision of a clutch actuated responsive to centrifugal force, said clutch embodying a novel clutch plate and associated parts thereof providing an assembled centrifugal clutch of simple construction and wherein the engagement of the clutch elements are progressive, smooth and chatter free.

While I have illustrated a preferred embodiment of my invention, many modifications may be made without departing from the spirit of the invention, and I do not wish to be limited to the precise details of construction set forth but wish to avail myself of all changes within the scope of the appended claims.

I claim:

1. A centrifugal clutch comprising a rotatable drum, an annular friction lining loosely disposed in the drum, a rotatable driving hub, a radial clutch plate fixed to the hub and formed with a plurality of circumferentially spaced cut-out portions and having a group of laterally projecting ears at the marginal regions of each of said cut-out portions, centrifugally responsive weights disposed in circular array, each weight having a central cavity formed therein for loosely receiving a group of ears whereby the weights are loosely supported so as to be susceptible to radial movement with respect to the hub, a coil spring disposed in each cavity, said coil spring being maintained under a compressive load by the engagement by one end thereof with one of said ears and by the engagement of the other end thereof with the corresponding weight whereby the particular weight is urged radially toward said hub, said weights being individually operable responsive to centrifugal force to overcome their respective springs permitting the weights to move outwardly away from the hub to effect engagement of the weights with a friction surface of said lining to induce rotary movement of said drum responsive to progressive engagement of said weights with said lining, and said lining with said drum.

2. A centrifugal clutch comprising a rotatable drum, an annular friction lining loosely disposed in the drum, a rotatable driving hub, a radial clutch plate fixed to the hub and formed with three circumferentially spaced cut-out portions and having three laterally projecting ears at the marginal regions of each of said cut-out portions, centrifugally responsive weights disposed in circular array, each weight having a rectangular cavity formed therein for loosely receiving said ears whereby the weights may be moved radially with respect to the hub, a coil spring disposed in each cavity, said coil spring being maintained under a compressive load by the engagement by one end thereof with one of said ears and by the engagement of the other end thereof with the mating weight whereby the particular weight is urged radially toward said hub, said weights being individually operable responsive to centrifugal force to overcome their respective springs permitting the weights to move outwardly away from the hub to effect engagement of the weights with a friction surface of said lining to induce rotary movement of said drum responsive to progressive engagement of said weights with said lining, and said lining with said drum.

References Cited in the file of this patent

UNITED STATES PATENTS

| | | |
|---|---|---|
| 1,683,954 | Carrey | Sept. 11, 1928 |
| 2,000,713 | Norris | May 7, 1935 |
| 2,074,510 | Junkers | Mar. 23, 1937 |
| 2,214,602 | Arnold | Sept. 10, 1940 |
| 2,203,862 | Eason | June 11, 1940 |
| 2,504,177 | Bruestle | Apr. 18, 1950 |
| 2,543,873 | Scruby | Mar. 6, 1951 |
| 2,691,437 | Dalrymple | Oct. 12, 1954 |

FOREIGN PATENTS

| | | |
|---|---|---|
| 24,833 | Great Britain | July 25, 1912 |
| 16,749/34 | Australia | Nov. 15, 1934 |
| 105,301 | Great Britain | Apr. 12, 1917 |
| 897,941 | France | June 19, 1944 |